US008870608B2

(12) United States Patent
Weiden

(10) Patent No.: US 8,870,608 B2
(45) Date of Patent: Oct. 28, 2014

(54) OPEN SPRING MECHANICAL CLAMPING LUG

(75) Inventor: Conrad Weiden, Chapel Hill, NC (US)

(73) Assignee: Schneider Electric USA, Inc., Palatine, IL (US)

( * ) Notice: Subject to any disclaimer, the term of this patent is extended or adjusted under 35 U.S.C. 154(b) by 55 days.

(21) Appl. No.: 13/618,232

(22) Filed: Sep. 14, 2012

(65) Prior Publication Data

US 2014/0080350 A1 Mar. 20, 2014

(51) Int. Cl.
*H02H 9/00* (2006.01)

(52) U.S. Cl.
USPC ........................................................ 439/811

(58) Field of Classification Search
USPC .................. 439/811, 812, 801, 814, 858, 816
See application file for complete search history.

(56) References Cited

U.S. PATENT DOCUMENTS

| | | | | | |
|---|---|---|---|---|---|
| 1,531,816 | A | | 3/1925 | Russell | |
| 2,265,911 | A | | 12/1941 | Landmeier | 24/125 |
| 2,746,025 | A | | 5/1956 | Radack | 339/272 |
| 2,777,119 | A | * | 1/1957 | Edmunds | 439/812 |
| 2,892,167 | A | | 6/1959 | Ritz | 336/174 |
| 2,907,978 | A | * | 10/1959 | Bergan | 439/811 |
| 3,539,977 | A | * | 11/1970 | Woertz | 439/811 |
| 3,559,156 | A | | 1/1971 | Coley | 339/272 |
| 3,683,414 | A | | 8/1972 | DeAngelo et al. | 339/272 |
| 4,063,376 | A | | 12/1977 | Horiuchi | 38/41 |
| 4,331,377 | A | * | 5/1982 | Ebbinghaus et al. | 439/733.1 |
| 4,507,709 | A | | 3/1985 | Morris et al. | 361/400 |
| 4,589,722 | A | | 5/1986 | Hall et al. | 339/272 |
| 4,809,132 | A | | 2/1989 | Palmieri et al. | 361/353 |
| 4,907,342 | A | | 3/1990 | Castonguay et al. | 29/622 |
| 5,029,038 | A | * | 7/1991 | Covi et al. | 361/58 |
| 5,327,112 | A | | 7/1994 | Rossetti | 335/78 |
| 5,553,787 | A | * | 9/1996 | Guginsky | 439/472 |
| 5,674,079 | A | * | 10/1997 | Auclair | 439/92 |

(Continued)

FOREIGN PATENT DOCUMENTS

| | | |
|---|---|---|
| DE | 18 74 873 | 7/1963 |
| DE | 18 81 162 | 10/1963 |

(Continued)

OTHER PUBLICATIONS

Square-D; "*Instruction Bulletin: One-Pole QO® and QOB Equipment Protective Device* (*EPD*) (*30 mA Ground-Fault Trip Level*)"; Sep. 2003 (4 pages).

(Continued)

*Primary Examiner* — Gary Paumen
(74) *Attorney, Agent, or Firm* — Locke Lord LLP

(57) ABSTRACT

A mechanical lug assembly for an electrical power device includes a spring clamp and a cradle. The spring clamp has a fixed section, a clamping section, and a deflecting section. The deflecting section has a deflecting spring force DF to allow flexible bending of the clamping section relative to the fixed section. The clamping section is offset relative to the fixed section. The cradle has a fastened section mounted to the fixed section to form a closed end of the lug assembly. The cradle has a terminal section extending from the fastened section along the clamping section to form an open end of the lug assembly. The cradle further has a pair of side walls extending at an angle from respective sides of the terminal section towards the spring clamp. The clamping section is fixed in place between the side walls.

20 Claims, 5 Drawing Sheets

(56) References Cited

U.S. PATENT DOCUMENTS

| | | | | |
|---|---|---|---|---|
| 5,683,393 | A | 11/1997 | Ralph | 606/61 |
| 5,776,135 | A | 7/1998 | Errico et al. | 606/61 |
| 5,889,450 | A | 3/1999 | Kim et al. | 355/18 |
| 6,146,212 | A * | 11/2000 | Kipnik | 439/709 |
| 6,495,038 | B1 * | 12/2002 | Kondoh et al. | 210/232 |
| 6,639,770 | B2 | 10/2003 | Tiemann et al. | 361/45 |
| 6,930,610 | B2 | 8/2005 | Gao et al. | 340/635 |
| 7,002,440 | B2 | 2/2006 | Attarian et al. | 335/18 |
| 7,026,894 | B2 | 4/2006 | Tobin et al. | 335/16 |
| 7,075,021 | B2 | 7/2006 | Rowe et al. | 200/50.21 |
| 7,427,856 | B2 | 9/2008 | Jones | 324/117 |
| 7,477,501 | B2 | 1/2009 | Nelson et al. | 361/93 |
| 7,493,222 | B2 | 2/2009 | Bruno | 702/64 |
| 7,511,229 | B2 | 3/2009 | Vlasak et al. | 174/267 |
| 7,514,932 | B2 | 4/2009 | Murry et al. | 324/508 |
| 7,535,686 | B2 | 5/2009 | Valdes et al. | 361/42 |
| 2003/0013353 | A1 * | 1/2003 | Sakaguchi et al. | 439/877 |
| 2006/0274482 | A1 | 12/2006 | Vlasak et al. | 174/267 |
| 2008/0012677 | A1 | 1/2008 | Colsch et al. | 336/178 |
| 2008/0188140 | A1 | 8/2008 | Hill et al. | 439/805 |
| 2009/0015184 | A1 | 1/2009 | Knierim | 318/490 |
| 2009/0045892 | A1 | 2/2009 | Nelson et al. | 335/202 |

FOREIGN PATENT DOCUMENTS

| | | | |
|---|---|---|---|
| DE | 18 91 048 | 4/1964 | |
| DE | 37 38 907 A1 | 6/1989 | H01F 40/00 |
| EP | 2 015 320 A1 | 1/2009 | H01F 13/02 |
| FR | 2 946 711 A1 | 6/2009 | F16B 29/00 |
| WO | WO2012/000919 | 1/2012 | |

OTHER PUBLICATIONS

Square-D; "*Instruction Bulletin: HOM One-Pole Equipment Protection Device* (*EPD*)"; Nov. 2003 (4 pages).

Square-D; "*Instruction Bulletin: HOM Two-Pole Equipment Protection Device* (*EPD*)"; Nov. 2003 (6 pages).

Square D, Mechanical Lug Kit Information Sheet, 2004 (1 page).

Square-D; "*Instruction Bulletin: Two-Pole QO®/QOB Circuit Breaker and Equipment Protective Device* (*EPD*) (*30 mA Ground-Fault Trip Level*)"; Apr. 2008 (4 pages).

Square-D; "*Neutral Current Transformers for Masterpact® NT, P-Frame and NS630b-NS1600 Circuit Breaker*"; Apr. 2008 (6 pages).

Square-D; "*Instruction Bulletin: GFM150HD and GFM250JD Ground-Fault Modules With Micrologic® Trip Level*"; Jul. 2008 (20 pages).

Schneider Electric, PowerPact® M-, P- and R-Frame, and Compact® NS630B-NS3200 Circuit Breakers Catalog, Aug. 2009 (2 pages).

English Language Machine Translation of German Patent No. DE1881162—4 pages.

English Language Machine Translation of International Publication No. WO2012/000919—11 pages.

* cited by examiner

OPEN SPRING MECHANICAL CLAMPING LUG

FIELD OF THE INVENTION

This invention is directed generally to electrical systems, and, more particularly, to a lug assembly for securing an electrical wire connection.

BACKGROUND OF THE INVENTION

Electrical switchgear and/or motor equipment systems, including overload relays, circuit breakers, motor controllers and/or contactors, low-voltage switchgear devices, and medium-voltage switchgear devices, use wire connectors (commonly referred to as lugs) to electrically and physically connect a conductor wire to a power terminal. Typical wire connectors, however, fail to facilitate an efficient connection procedure to achieve a secure connection between a terminal and a power wire. For example, to connect a terminal to a respective power wire, the wire end being connected must first be properly treated, by stripping and cutting to appropriate length requirements. The wire must, then, be guided into the lug and a binding screw must be used to secure the wire.

The guiding of the wire is problematic at least because the wire typically resists being forced into the lug. As such, a field installer must force, and struggle with, the wire as it is being guided into the lug. Furthermore, to ensure a proper electrical connection, extra precaution must be taken to fasten the binding screw in accordance with specific, proper torque requirements. Nevertheless, the resulting electrical connection is still prone to loosening due to wire creep or temperature cycling.

SUMMARY OF THE INVENTION

In an implementation of the present invention, a mechanical lug has an inline, sized and spring-loaded clamp and an open cradle for receiving within an open end a sized conductor wire parallel to a power terminal of an electrical device. The power terminal is surrounded by the cradle and the spring clamp, and is fastened to the cradle and the spring clamp via a screw. The conductor wire is laid down in the cradle and retained in contact with the power terminal, between the spring clamp and the power terminal, without applying a direct compressive force by the screw. Consequently, the screw is not subjected to specific torque requirements. Furthermore, laying down the conductor wire, instead of struggling to guide the conductor wire into a lug hole (as required by standard lugs), facilitates easy assembly of the conductor wire to the power terminal.

In another implementation of the present invention, a mechanical lug assembly for an electrical power device includes a spring clamp and a cradle. The spring clamp has a fixed section, a clamping section, and a deflecting section. The deflecting section has a deflecting spring force DF to allow flexible bending of the clamping section relative to the fixed section. The clamping section is offset relative to the fixed section. The cradle has a fastened section mounted to the fixed section to form a closed end of the lug assembly. The cradle has a terminal section extending from the fastened section along the clamping section to form an open end of the lug assembly. The cradle further has a pair of side walls extending at an angle from respective sides of the terminal section towards the spring clamp. The clamping section is fixed in place between the side walls.

In another alternative implementation of the present invention, an electrical power system includes a power terminal having a terminal end and a conductor wire having a wire end. The electrical power system further includes a mechanical lug assembly for attachment of the power terminal to the conductor wire. The mechanical lug assembly includes a spring clamp and a cradle. The spring clamp has a deflecting section connecting a fixed section to a clamping section. The deflecting section has a deflecting spring force DF to allow flexible bending of the clamping section relative to the fixed section. The clamping section is offset relative to the fixed section. The cradle has a fastened section and a terminal section. The fastened section is secured to the fixed section of the spring clamp and to the terminal end to form a closed end of the lug assembly. The terminal section extends from the fastened section in a parallel configuration relative to the clamping section and the terminal end to form an open end of the lug assembly. In response to the wire end being inserted within the open end in a parallel configuration relative to the terminal end, the deflecting spring force DF is exerted by the deflecting section and mechanically secures the wire end to the lug assembly in electrical contact with the terminal end.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings.

DETAILED DESCRIPTION OF THE ILLUSTRATED EMBODIMENTS

Figure 1:
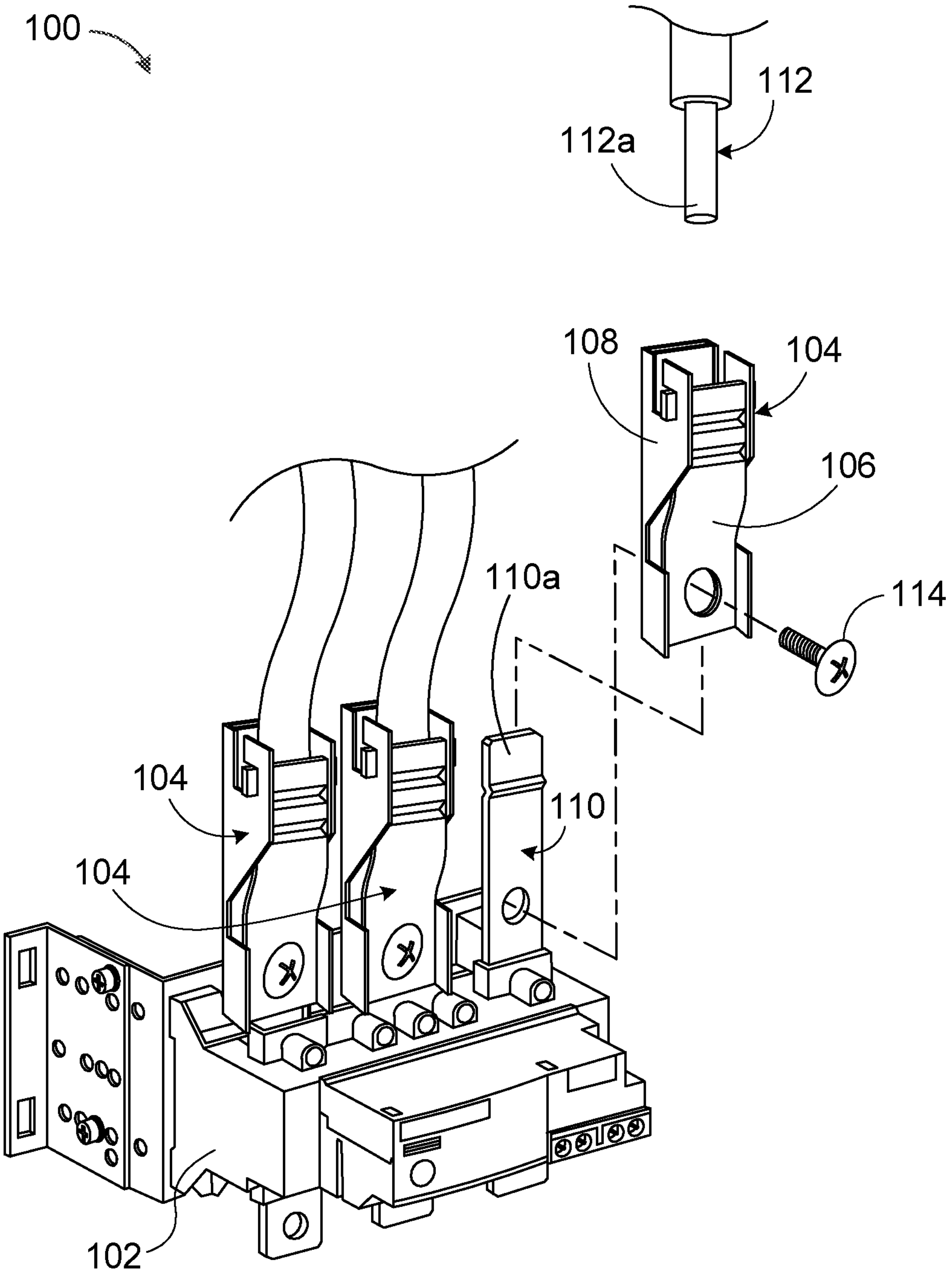
FIG. 1 is a perspective view of an electrical power system with a mechanical lug assembly.

Referring to FIG. 1, an electrical power system 100 includes a motor overload relay 102 and a plurality of mechanical lug assemblies 104. The motor overload relay 102 is a protective electrical device that includes, at a minimum, a thermal overload relay that is designed to open a starting circuit and, thus, cut electrical power to the protected motor if the motor draws too much current from an electrical supply for an extended period of time. In other examples, the electrical power system 100 includes instead of or in addition to the motor overload relay 102 one or more low voltage switchgear devices, medium voltage switchgear devices, circuit breakers, motor controllers, and motor contactors.

Each lug assembly 104 includes a spring clamp 106 and a cradle 108 for mechanically and electrically attaching a power terminal 110 having a terminal end **110*a* to a conductor wire 112 having a wire end 112*a*. In other words, the spring clamp 106 and the cradle 108 work in cooperation to clamp the respective ends 110***a*, 112*a* of the terminal 110 and the wire 112. The spring clamp 106 and the cradle 108 are fastened to each other via a screw 114 to provide an attachment that eliminates direct contact between the conductor wire 112 and the screw 114. As such, the screw 114 is not subjected to specific torque requirements associated with the conductor wire 112.

Figure 2B:
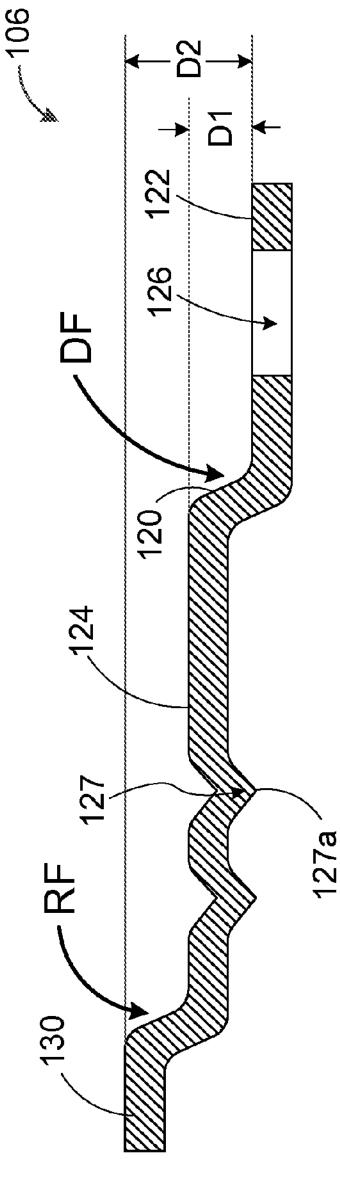
FIG. 2B is a cross-sectional view of the spring clamp of FIG. 2A.
Figure 2A:
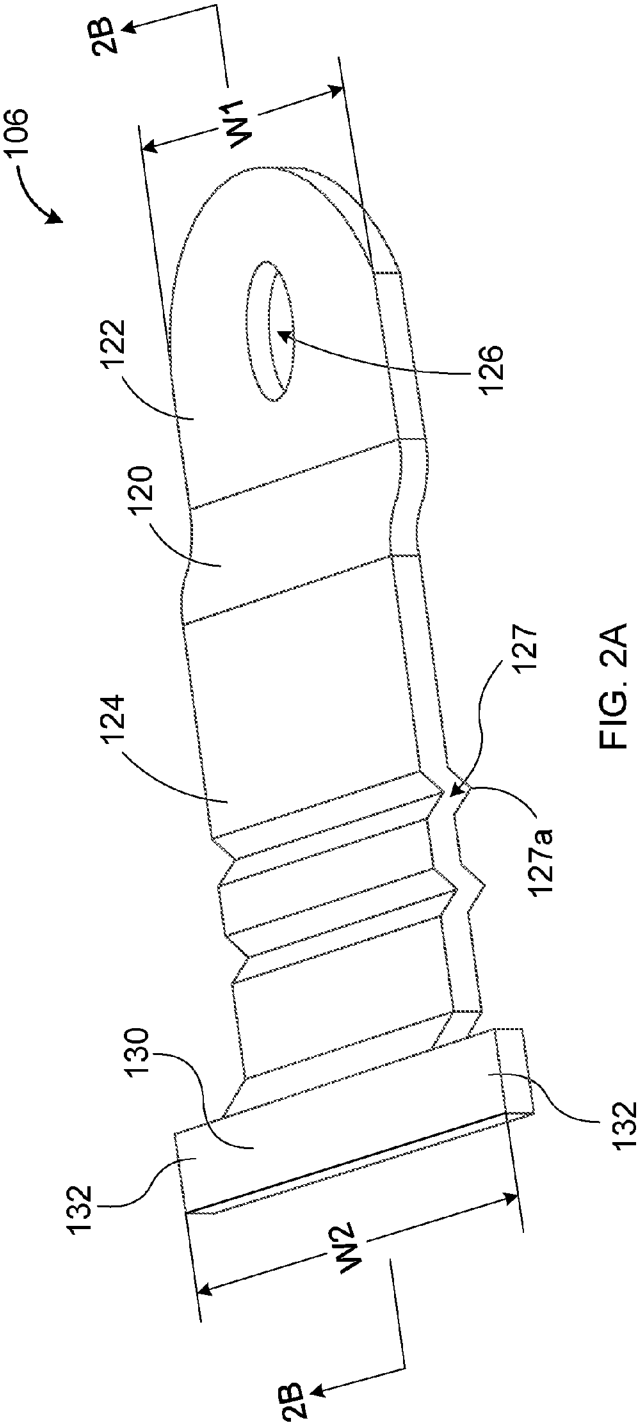
FIG. 2A is a perspective view of a spring clamp for the mechanical lug assembly.

Referring to FIGS. 2A and 2B, the spring clamp 106 has a deflecting section 120 located between a fixed section 122 and a clamping section 124. The spring clamp 106 further has a clearance hole 126 in the fixed section 122 for receiving the screw 114. The clearance hole 126 is centrally located along a clamp width W1 of the fixed section 122.

The deflecting section 120 is profiled to provide a deflecting spring force DF that allows flexible bending of the clamping section 124 relative to the fixed section 122. The deflecting spring force DF provides a primary spring load to the lug assembly 104 and allows for variations in wire diameters and wire creep during the life of the mechanical lug assembly 104.

The clamping section 124 is offset vertically from and is in parallel relative to the fixed section 122 by a distance D1 and includes a plurality of serrations 127 extending from a bottom surface of the spring clamp 106. The serrations 127 have respective sharp peaks 127*a* that are intended to protrude through the wire end 112*a*. Thus, the serrations 127 prevent the wire 112 from being pulled (or removed) from the lug assembly 104.

The spring clamp 106 includes a retaining section 130 extending from, offset vertically from and is in parallel relative to, the clamping section 124 and having a pair of retaining tabs 132. The tabs 132 extend outwards to a tab width W2 relative to the clamp width W2. The retaining section 130 is offset relative to the fixed section 122 by a distance D2. Thus, the retaining section 130, the clamping section 124, and the fixed section 122 are offset vertically and in parallel relative to each other at respective distances D1, D2.

Figure 5A:
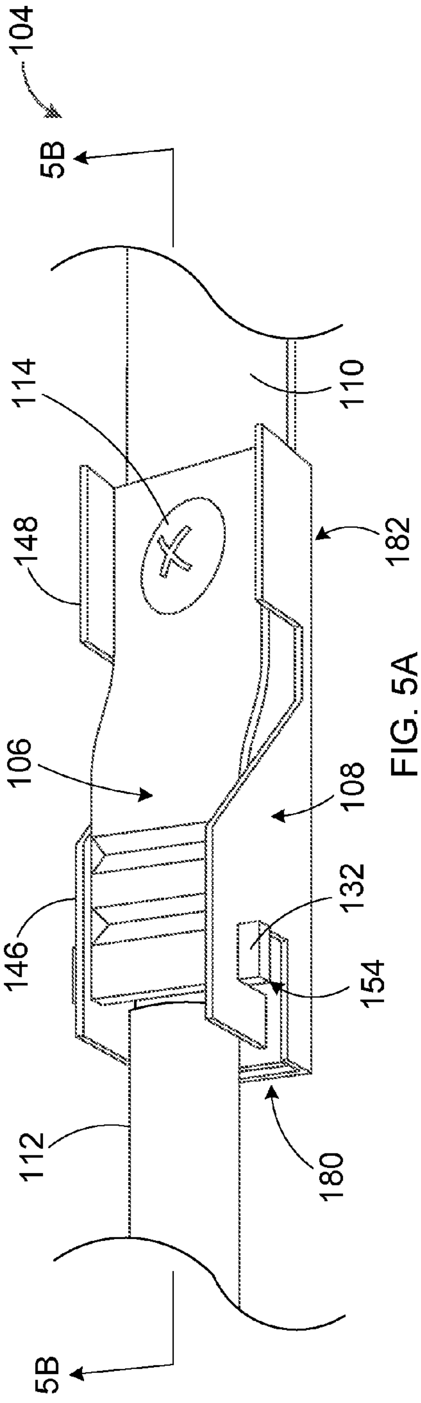
FIG. 5A is a perspective view of the lug assembly of FIG. 1.
Figure 5B:
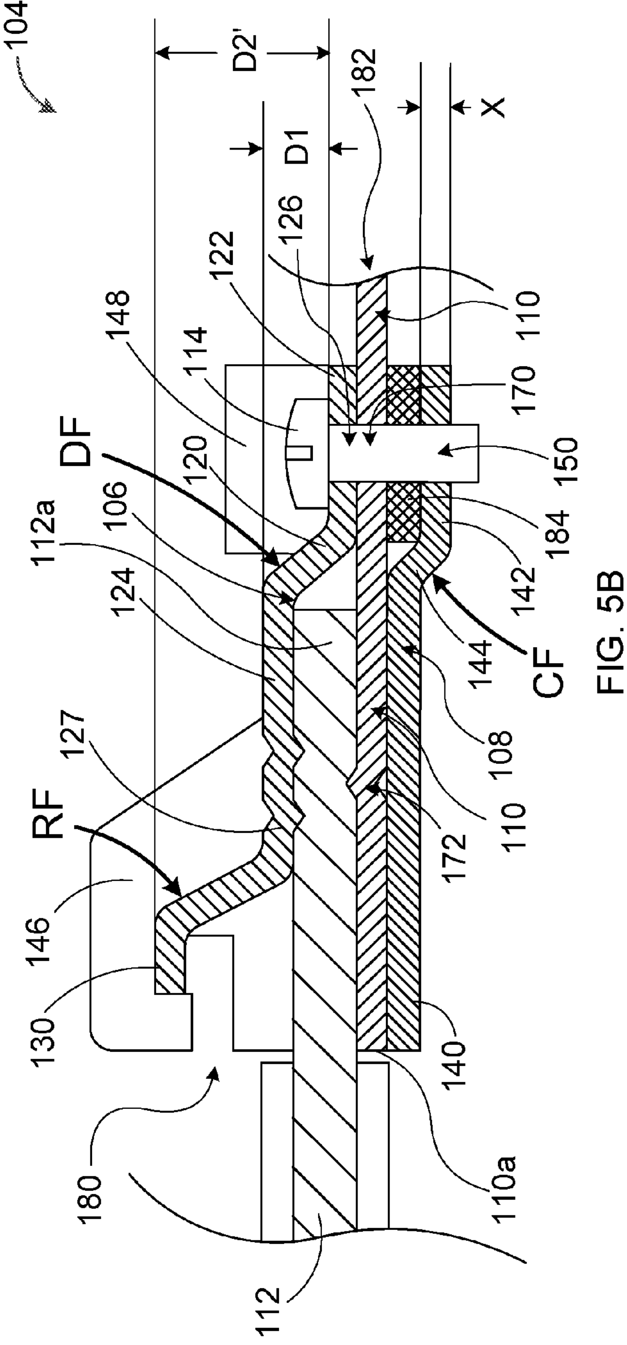
FIG. 5B is a cross-sectional view of the lug assembly of FIG. 5A.

The retaining section 130 is flexibly movable, having a retaining spring force RF that allows bending relative to the clamping section 124. When assembled in the lug assembly 104, the retaining force allows the retaining section 130 to move in a non-parallel configuration relative to the fixed section 122 to a distance D2'. As illustrated in FIG. 5B, distance D2' is greater than the pre-assembly distance D2.

Figure 3B:
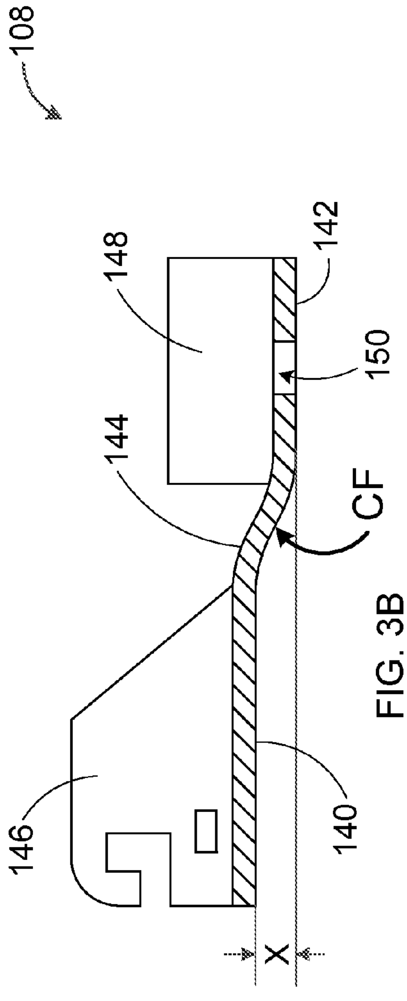
FIG. 3B is a cross-sectional view of the cradle of FIG. 3A.
Figure 3A:
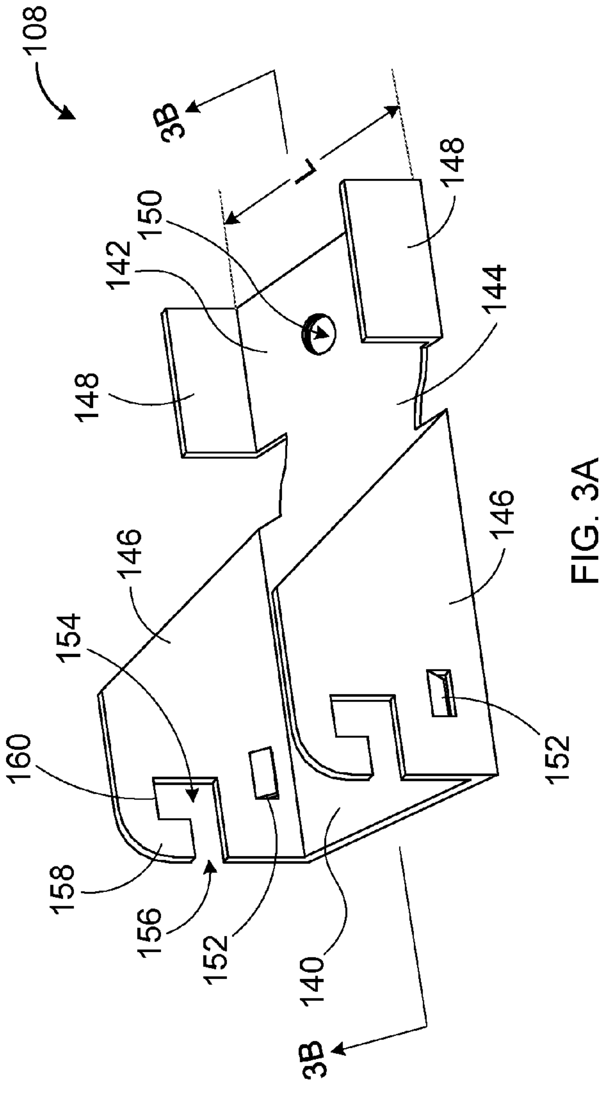
FIG. 3A is a perspective view of a cradle for the mechanical lug assembly.

Referring to FIGS. 3A and 3B, the cradle 108 has a terminal section 140 extending from a fastened section 142, with a spring section 144 separating the two sections 140, 142. A pair of side walls 146 extend perpendicularly from respective sides of the terminal section 140 to provide an enclosure space for the clamping section 124 and the retaining section 130 of the spring clamp 106. Furthermore, a pair of terminal sides 148 extend in a similar manner from respective sides of the fastened section 142. The terminal sides 148 are smaller than the side walls 146 and provide an enclosure space for the fixed section 122 of the spring clamp 106.

The cradle 108 has a width L for accommodating, within, the spring clamp 106. Also, the fastened section 142 is vertically offset in a parallel configuration from the terminal section 140 by a distance X. The spring section 144, along distance X, has a cradle spring force CF for allowing flexible bending of the terminal section 140 relative to the fastened section 142. Specifically, the cradle spring force CF of the spring section 144 presses the terminal section 140 towards the spring clamp 106 when assembled in the lug assembly 104.

The cradle 108 includes a threaded hole 150 in the fastened section 142. The threaded hole 150 is centrally located along the width L and is configured to match the clearance hole 126 of the spring clamp 106. As such, the threaded hole 150 is configured to receive and secure the screw 114 for fastening the cradle 108 to the spring clamp 106.

The side walls 146 include a pair of internal stops 152 for eliminating or reducing lateral motion of the terminal end 110*a* relative to the cradle 108. When inserted in position, the terminal end 110*a* is separated from each side wall 146 by a small clearance gap, which is intended to facilitate easy attachment of the cradle 108 to the terminal 110. However, through normal uses, the terminal end 110*a* is prone to side-to-side movement along the width L of the cradle 108. The internal stops 152 are to be inserted into respective sides of the terminal end 110*a* to reduce, or prevent, such lateral movement.

The side walls 146 further include a pair of retaining holes 154, which are located above the internal stops 152. The retaining holes 154 are formed to receive, respectively, the retaining tabs 132 of the spring clamp 106. Each retaining hole 154 has an open end 156, a lip 158, and an upper end 160. A respective retaining tab 132 is insertable through the open end 156 (as illustrated in FIG. 5A) and, in response to the retaining spring force RF, is automatically pressed upwards against the upper end 160. The lip 158 prevents the retaining tab 132 from being disengaged from the retaining hole 154.

Figure 4:
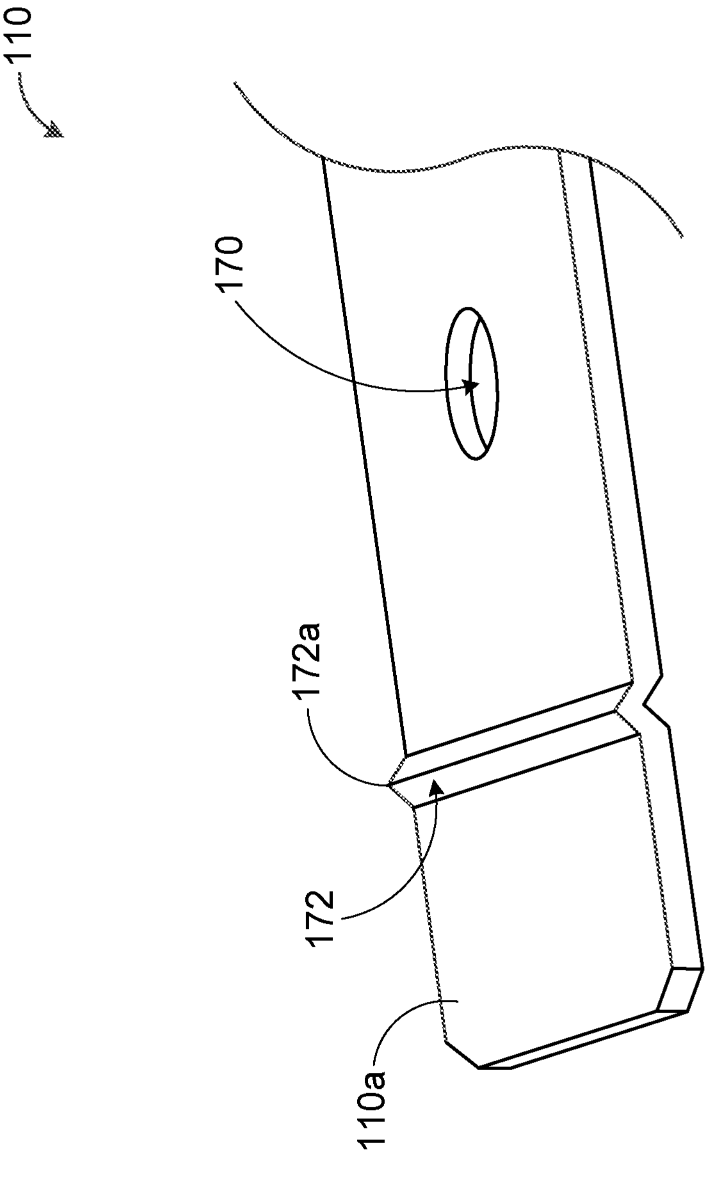
FIG. 4 is a perspective view of a power terminal for the mechanical lug assembly.

Referring to FIG. 4, the new terminal 110 has a clearance hole 170 and a serration 172. The serration 172 is located towards the terminal end 110*a* and has a peak 172*a* that is intended to protrude through the wire end 112*a* (as shown in FIG. 5B). The peak 172*a* is directed upwards and extends from a top surface of the terminal 110. Thus, similar to the serrations 127 of the clamping section 124, the serration 172 is intended to prevent the wire 112 from being pulled from the lug assembly 104. In addition to or instead of the serration 172, one or more other protrusions and indentations can be further included in the terminal 110 to further secure the connection of the terminal 110 in the lug assembly 104.

Referring to FIGS. 5A and 5B, the cradle 108 and the spring clamp 106 cooperate with each other to clamp the conductor wire 112 to the power terminal 110. The cradle 108 is made to slide onto the terminal 110 so that the clearance hole 170 in the terminal 110 is aligned with the threaded hole 150 of the cradle 108. As such, a top surface of the cradle 108 slides in mechanical contact with a bottom surface of the terminal 110 until the holes 170, 150 are aligned.

The conductor wire 112 is inserted through an open end 180 of the lug assembly 104 and placed into the cradle 108 so that it rests on top of the terminal 110. Thus, a bottom area of the conductor wire 112 is placed in mechanical and electrical contact with a top surface of the terminal 110. Then, the spring clamp 106 is inserted into the cradle 108 such that the clearance hole 126 of the spring clamp 106 is aligned with the clearance hole 170 of the terminal 110 and the threaded hole 150 of the cradle 108. Once aligned, the screw 115 secures the three components—the spring clamp 106, the cradle 108, and the terminal 110—to each other to form a closed end 182 of the lug assembly 104. The internal stops 152 (not shown), which are optional, are helpful in retaining the terminal 110 fixed in place.

A spacer 184 is provided in-between the terminal 110 and the fastened section 142 of the cradle 108 to prevent relative axial movement between the terminal 110 and the fastened section 142. Optionally, a lock washer (not shown) can be provided between the head of the screw 114 and the spring clamp 106 to help prevent loosening of the screw 114.

At the open end 182, the retaining tabs 132 are secured in position, respectively, in the retaining holes 154. As the retaining tabs 132 are secured to the retaining holes 154, the clamping section 124 of the spring clamp 106 pivots down towards the terminal 110 to clamp the conductor wire 112 to the terminal 110. The pivoting of the clamping section 124 is facilitated by the flexible bending (and associated spring forces) of the retaining section 130 and the deflecting section 120. In response to the pivoting, the pre-assembly distance D2 between the fixed section 122 and the retaining section 130 increases to the assembled distance D2'.

The configuration of the lug assembly 104 achieves a good electrical and mechanical contact between the terminal 110 and the conductor wire 112. Furthermore, the serrations 127, 172 of the spring clamp 106 and terminal 110, respectively, help prevent the conductor wire 112 from being pulled out of the lug assembly 104 when the conductor wire 112 is being pulled in the field. Also, the cradle spring force CF of the cradle spring section 144 provides added clamping force to help maintain the good electrical connection between the terminal 110 and the conductor wire 112.

The lug assembly 104 provides many benefits relative to standard lugs. One benefit is directed to eliminating a need to having to push and insert a conductor wire as typical with standard lugs. Instead, an installer can lay large conductor wires onto respective power terminals. The ability to lay the conductor wires reduces effort and time typically requires to inset the conductor wires, and, also, simplifies treatment of the wire ends (e.g., stripping and cutting to length).

Another benefit is directed to reducing or eliminating adverse effects caused by wire creep and temperature cycling. The spring loaded forces of the spring clamp 106 and the cradle 108 (e.g., the deflecting spring force DF, the cradle spring force CF, and the retaining spring force RF) help maintain a tight connection by pressing the clamp 106 and the cradle 108 against each other, which, in turn, forces the terminal 110 to be pressed against the conductor wire 112.

Yet another benefit is directed to eliminating the need to have the screw 114 subjected to specific torque requirements. Because the screw 114 does not make direct contact with the conductor wire 112, the screw 114 does not need to be tightened to a specific torque, as would be typically required in standard lug assemblies, to provide a desired torque load. Other benefits of the lug assembly 104 are further directed to cost reductions based on reductions in required material for the lug assembly 104.

While particular embodiments, aspects, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims. For example, the cradle 108 may include fins extending from the side walls 146 and/or the terminal sides 148 for cooling the electrical connection between the conductor wire 112 and the terminal 110. Furthermore, the fins can include forms for fixing an insulating barrier that provides an additional level of shock or arc flash protection. For example, the forms can be similar to the retaining holes 154 for retaining tabs of the insulating barrier. In another example, the screw 114 can be replaced by a mechanical latch that would hold the spring clamp 106 in closed position relative to the cradle 108. In yet another example, the spring clamp 106 can be formed and dimensioned to accommodate different wire sizes and types. Similarly, the cradle 108 can be dimensioned to accommodate smaller or larger conductor wires.

What is claimed is:

1. A mechanical lug assembly for an electrical power device, the mechanical lug assembly comprising:

a spring clamp having a fixed section, a clamping section, and a deflecting section, the deflecting section having a deflecting spring force DF to allow flexible bending of the clamping section relative to the fixed section, the clamping section extending from the deflecting section and being substantially parallel to and offset from the fixed section; and a cradle having a fastened section mounted to the fixed section of the spring clamp to form a closed end of the lug assembly, the cradle having a terminal section extending from the fastened section along the clamping section of the spring clamp to form an open end of the lug assembly, the cradle having a pair of side walls extending at an angle from respective sides of the terminal section towards the spring clamp, the clamping section of the spring clamp being fixed in place between the side walls.

2. The mechanical lug assembly of claim 1, wherein the spring clamp includes a clearance hole in the fixed section and the cradle includes a threaded hole in the fastened section, the fastened section being secured to the fixed section via a fastener inserted through the spring clamp clearance hole and fastened into the threaded hole.

3. The mechanical lug assembly of claim 2, further comprising a power terminal having a terminal end with a terminal clearance hole, the fastener being inserted through the terminal clearance hole, prior to being inserted through the threaded hole, to secure the terminal end in the closed end of the lug assembly between the spring clamp and the cradle.

4. The mechanical lug assembly of claim 1, wherein the clamping section of the spring clamp includes a serration.

5. The mechanical lug assembly of claim 4, further comprising a conductor wire having a wire end, the conductor wire being inserted between the spring clamp and the cradle, the serration protruding into the wire end to prevent the conductor wire from being removed from the lug assembly.

6. The mechanical lug assembly of claim 1, further comprising a power terminal having a terminal end and a conductor wire having a wire end, the power terminal and the conductor wire being inserted in an overlapping configuration between the spring clamp and the cradle, the terminal end of the power terminal including one or more serrations protruding into the wire end to retard the conductor wire from being disconnected from the lug assembly.

7. The mechanical lug assembly of claim 1, wherein the spring clamp further includes a retaining section extending from the clamping section and having a pair of retaining tabs, each of the side walls of the cradle having a retaining hole formed to receive a respective one of the retaining tabs to fix in place the spring clamp at the open end.

8. The mechanical lug assembly of claim 1, wherein the cradle further includes a spring section between, and vertically offsetting, the fastened section and the terminal section, the spring section having a cradle spring force CF to allow flexible bending of the terminal section relative to the fastened section, the cradle spring force CF pressing the terminal section towards the spring clamp.

9. The mechanical lug assembly of claim 1, further comprising a power terminal having a terminal end and a conductor wire having a wire end, the wire end being laid down between and in direct contact with the clamping section of the spring clamp and the terminal end, the terminal end being inserted between and in direct contact with the wire end and the terminal section of the cradle.

10. The mechanical lug assembly of claim 1, wherein the mechanical lug assembly includes one or more electrical devices selected from a group consisting of low voltage switchgear devices, medium voltage switchgear devices, overload relays, circuit breakers, motor controllers, and motor contactors.

11. An electrical power system comprising:
a power terminal having a terminal end;
a conductor wire having a wire end; and
a mechanical lug assembly for attachment of the power terminal to the conductor wire, the mechanical lug assembly including
a spring clamp having a deflecting section connecting a fixed section to a clamping section, the deflecting section having a deflecting spring force DF to allow flexible bending of the clamping section relative to the fixed section, the clamping section being offset relative to the fixed section, and
a cradle having a fastened section and a terminal section, the fastened section being secured to the fixed section of the spring clamp and to the terminal end to form a closed end of the lug assembly, the terminal section extending from the fastened section in a parallel configuration relative to the clamping section and the terminal end to form an open end of the lug assembly;
wherein, in response to the wire end being laid down into the cradle in a parallel configuration relative to the terminal end, the deflecting spring force DF exerted by the deflecting section mechanically secures the wire end to the lug assembly in electrical contact with the terminal end.

12. The electrical power system of claim 11, wherein the spring clamp includes a spring clamp clearance hole in the fixed section and the cradle includes a threaded hole in the fastened section, the fastened section being secured to the fixed section via a screw inserted through the spring clamp clearance hole and fastened into the threaded hole.

13. The electrical power system of claim 12, wherein the terminal end includes a terminal clearance hole, the screw being inserted through the terminal clearance hole, prior to being inserted through the threaded hole, to secure the terminal end in the closed end of the lug assembly.

14. The electrical power system of claim 11, wherein the clamping section of the spring clamp includes a serration protruding into the wire end to prevent the conductor wire from being disconnected or pulled out from the lug assembly.

15. The electrical power system of claim 11, wherein the terminal end of the power terminal includes a serration protruding into the wire end to prevent the conductor wire from being disconnected from the lug assembly.

16. The electrical power system of claim 11, wherein the cradle further includes a pair of side walls extending substantially perpendicularly from respective sides of the terminal section towards the spring clamp to enclose respective sides of the open end.

17. The electrical power system of claim 16, wherein the spring clamp further includes a retaining section extending from the clamping section and having a pair of retaining tabs, each of the side walls of the cradle having a retaining hole formed to receive a respective one of the retaining tabs to fix in place the spring clamp at the open end.

18. The electrical power system of claim 11, wherein the cradle further includes a spring section between and vertically offsetting the fastened section and the terminal section, the spring section having a cradle spring force CF to allow flexible bending of the terminal section relative to the fastened section, the cradle spring force CF pressing the terminal section against the terminal end.

19. The electrical power system of claim 11, wherein the wire end is inserted between and in direct contact with the clamping section of the spring clamp and the terminal end, the terminal end being inserted between and in direct contact with the wire end and the terminal section of the cradle.

20. The electrical power system of claim 11, wherein the cradle further includes a pair of internal stops inserted into respective sides of the terminal end to reduce lateral movement of the terminal end relative to the cradle.

* * * * *